United States Patent
Xu et al.

(10) Patent No.: US 10,159,052 B2
(45) Date of Patent: Dec. 18, 2018

(54) METHOD AND APPARATUS FOR SOUNDING REFERENCE SIGNAL TRIGGERING AND POWER CONTROL FOR COORDINATED MULTI-POINT OPERATIONS

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 13/956,829

(22) Filed: Aug. 1, 2013

(65) Prior Publication Data

US 2014/0036809 A1    Feb. 6, 2014

Related U.S. Application Data

(60) Provisional application No. 61/679,596, filed on Aug. 3, 2012.

(51) Int. Cl.
*H04W 52/54* (2009.01)
*H04W 52/32* (2009.01)
*H04W 52/08* (2009.01)

(52) U.S. Cl.
CPC ......... *H04W 52/54* (2013.01); *H04W 52/322* (2013.01); *H04W 52/325* (2013.01); *H04W 52/08* (2013.01)

(58) Field of Classification Search
None
See application file for complete search history.

(56) References Cited

U.S. PATENT DOCUMENTS

2010/0303039 A1   12/2010   Zhang et al.
2012/0039273 A1   2/2012   Nam et al.
(Continued)

FOREIGN PATENT DOCUMENTS

CN    102378216 A    3/2012
WO    2011152685 A2    12/2011

OTHER PUBLICATIONS

International Search Report and Written Opinion—PCT/US2013/053364—ISA/EPO—Sep. 23, 2013.
(Continued)

*Primary Examiner* — Vinncelas Louis
(74) *Attorney, Agent, or Firm* — Patterson & Sheridan, LLP

(57) ABSTRACT

Certain aspects of the present disclosure provide methods and apparatus for sounding reference signal (SRS) triggering and power control for coordinated multi-point (CoMP) operations. One method generally includes maintaining separate power control processes for at least a first aperiodic SRS (A-SRS) and a second A-SRS, receiving, in a first subframe, a downlink transmission triggering transmission of at least one of the first and second A-SRS in a subsequent subframe, identifying which of the first and second A-SRS to transmit in the subsequent subframe, receiving a first power control command that indicates a power control value to apply to the identified A-SRS, and transmitting the identified A-SRS based in accordance with the first power control command.

39 Claims, 15 Drawing Sheets

(56) References Cited

U.S. PATENT DOCUMENTS

| | | | |
|---|---|---|---|
| 2012/0252474 A1 | 10/2012 | Tiirola et al. | |
| 2012/0281604 A1* | 11/2012 | Papasakellariou et al. | 370/310 |
| 2013/0028134 A1 | 1/2013 | Wang et al. | |
| 2013/0077571 A1* | 3/2013 | Papasakellariou et al. | 370/328 |
| 2013/0078913 A1* | 3/2013 | Lee et al. | 455/39 |
| 2013/0083729 A1 | 4/2013 | Xu et al. | |
| 2013/0156014 A1* | 6/2013 | Kim et al. | 370/336 |
| 2014/0071903 A1* | 3/2014 | Sorrentino | H04W 52/325 370/329 |

OTHER PUBLICATIONS

Panasonic: "SRS power control enhancement for Rel.11", 3GPP Draft; R1-122196 (Clean), 3rd Generation Partnership Project (3GPP), Mobile Competence Centre. 650, Route Des Lucioles. F-06921 Sophia-Antipolis Cedex; France, vol. RAN WG1, no. Prague, Czech Republic; May 21, 2012-May 25, 2012, May 12, 2012 (May 12, 2012), XP050600460, [retrieved on May 12, 2012] paragraphs [03 .1], [03. 2]. [0004].

Pantech: "Enhancement on SRS power control", 3GPP Draft; R1-122453, 3rd Generation Partnership Project (3GPP), Mobile Competence Centre; 650, Route Des Lucioles; F-06921 Sophia-Antipolis Cedex; France, vol. RAN WG1, no. Prague, Czech Republic; May 21, 2012-May 25, 2012, May 12, 2012 (May 12, 2012), XP050600706, [retrieved on May 12, 2012] paragraphs [0001], [02. 3].

QUALCOMM Incorporated: "SRS Power Control", 3GPP Draft; R1-123693 SRS Power Control, 3rd Generation Partnership Project (3GPP), Mobile Competence Centre; 650, Route Des Lucioles; F-06921 Sophia-Antipolis Cedex; France vol. RAN WG1, no. Qingdao, China; Aug. 13, 2012-Aug. 17, 2012, Aug. 5, 2012 (Aug. 5, 2012), XP050661567, Retrieved from the Internet: URL:http:jjwww.3gpp.orgjftpjtsgran/WG1 RL1/TSGR1 70/Docsj—[retrieved on Aug. 5, 2012] paragraphs [0003]. [03 .1]. [03. 2].

* cited by examiner

METHOD AND APPARATUS FOR SOUNDING REFERENCE SIGNAL TRIGGERING AND POWER CONTROL FOR COORDINATED MULTI-POINT OPERATIONS

CROSS-REFERENCE TO RELATED APPLICATIONS

The present Application for Patent claims priority to U.S. Provisional Application No. 61/679,596, filed Aug. 3, 2012, which is assigned to the assignee of the present application and hereby expressly incorporated by reference herein in its entirety.

FIELD

The present disclosure relates generally to communication systems, and more particularly, to a system and method for sounding reference signal (SRS) triggering and power control for coordinated multi-point (CoMP) operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects of the present disclosure provide a method for wireless communications by a user equipment (UE). The method generally includes maintaining separate power control processes for at least a first aperiodic sounding reference signal (A-SRS) and a second A-SRS, receiving, in a first subframe, a downlink transmission triggering transmission of at least one of the first and second A-SRS in a subsequent subframe, identifying which of the first and second A-SRS to transmit in the subsequent subframe, receiving a first power control command that indicates a power control value to apply to the identified A-SRS, and transmitting the identified A-SRS based in accordance with the first power control command.

Certain aspects of the present disclosure provide an apparatus for wireless communications by a UE. The apparatus generally includes means for maintaining separate power control processes for at least a first aperiodic sounding reference signal (A-SRS) and a second A-SRS, means for receiving, in a first subframe, a downlink transmission triggering transmission of at least one of the first and second A-SRS in a subsequent subframe, means for identifying which of the first and second A-SRS to transmit in the subsequent subframe, means for receiving a first power control command that indicates a power control value to apply to the identified A-SRS, and means for transmitting the identified A-SRS based in accordance with the first power control command.

Certain aspects of the present disclosure provide an apparatus for wireless communications by a UE. The apparatus generally includes at least one processor and a memory coupled to the at least one processor. The at least one processor is generally configured to maintain separate power control processes for at least a first aperiodic sounding reference signal (A-SRS) and a second A-SRS, receive, in a first subframe, a downlink transmission triggering transmission of at least one of the first and second A-SRS in a subsequent subframe, identify which of the first and second A-SRS to transmit in the subsequent subframe, receive a first power control command that indicates a power control value to apply to the identified A-SRS, and transmit the identified A-SRS based in accordance with the first power control command.

Certain aspects of the present disclosure provide a computer-program product for wireless communications by a UE. The computer-program product generally includes a computer-readable medium having code for maintaining separate power control processes for at least a first aperiodic sounding reference signal (A-SRS) and a second A-SRS, receiving, in a first subframe, a downlink transmission triggering transmission of at least one of the first and second A-SRS in a subsequent subframe, identifying which of the first and second A-SRS to transmit in the subsequent subframe, receiving a first power control command that indicates a power control value to apply to the identified A-SRS, and transmitting the identified A-SRS based in accordance with the first power control command.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various

DETAILED DESCRIPTION

Figure 1:
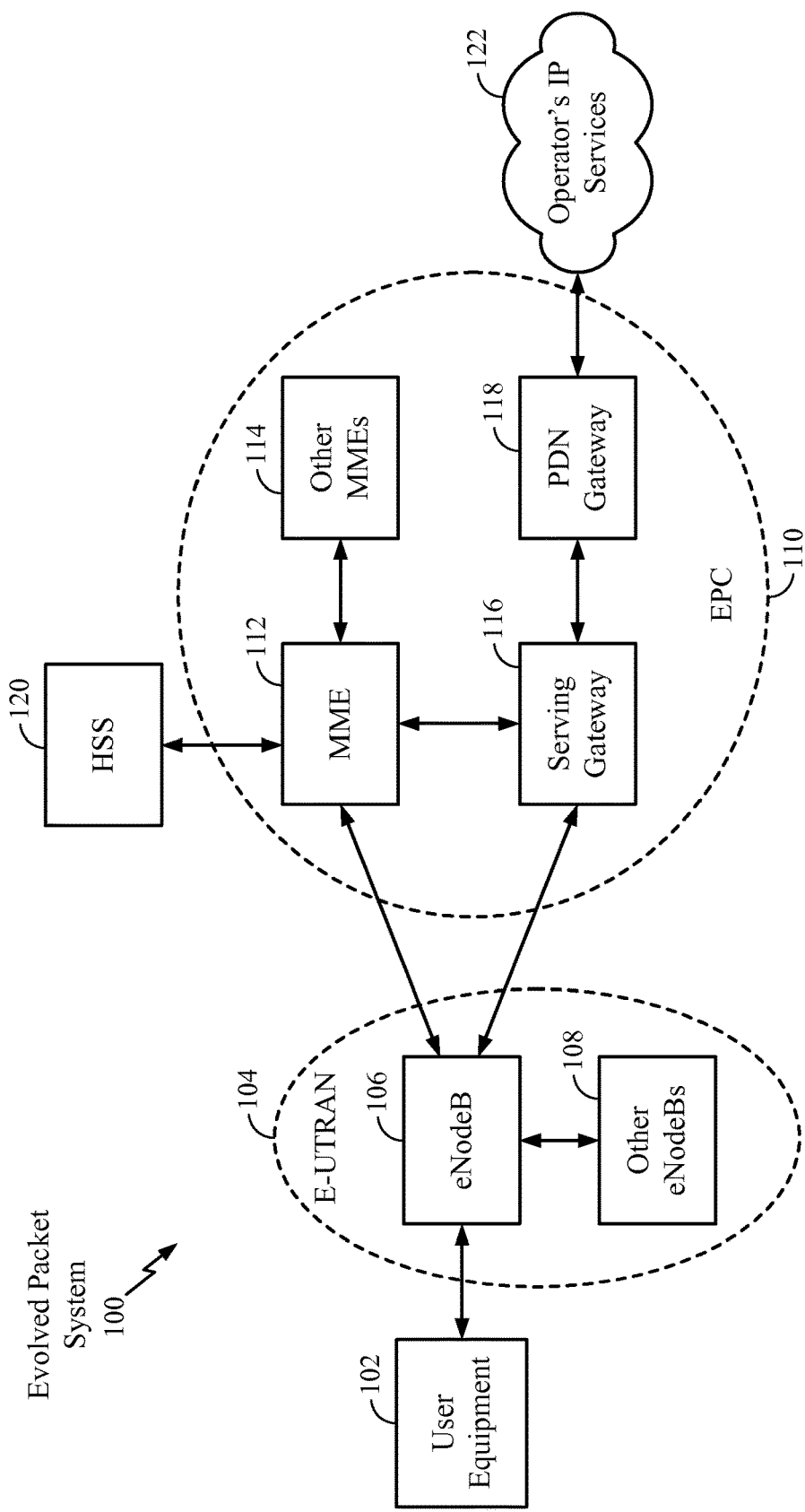
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
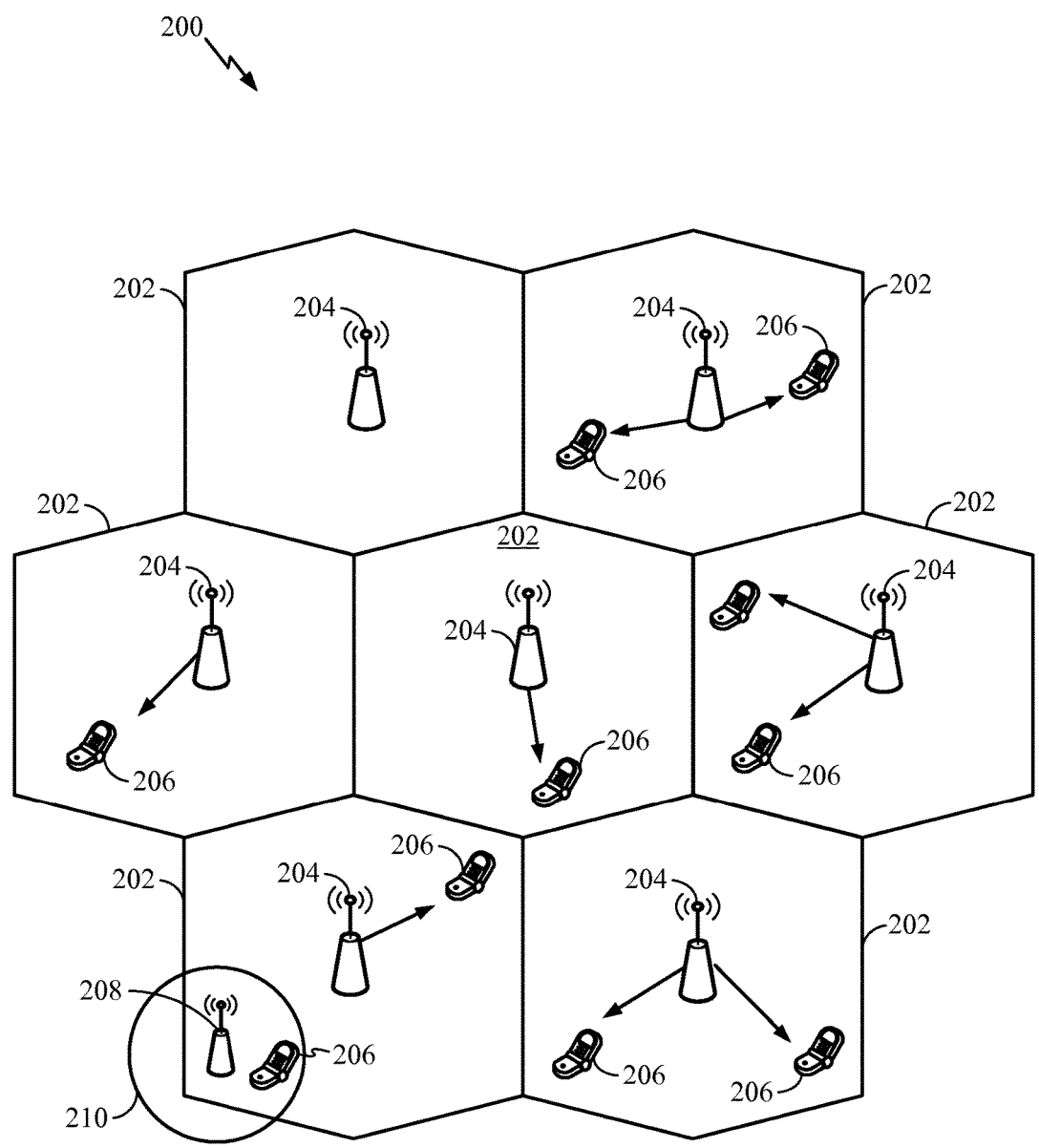
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
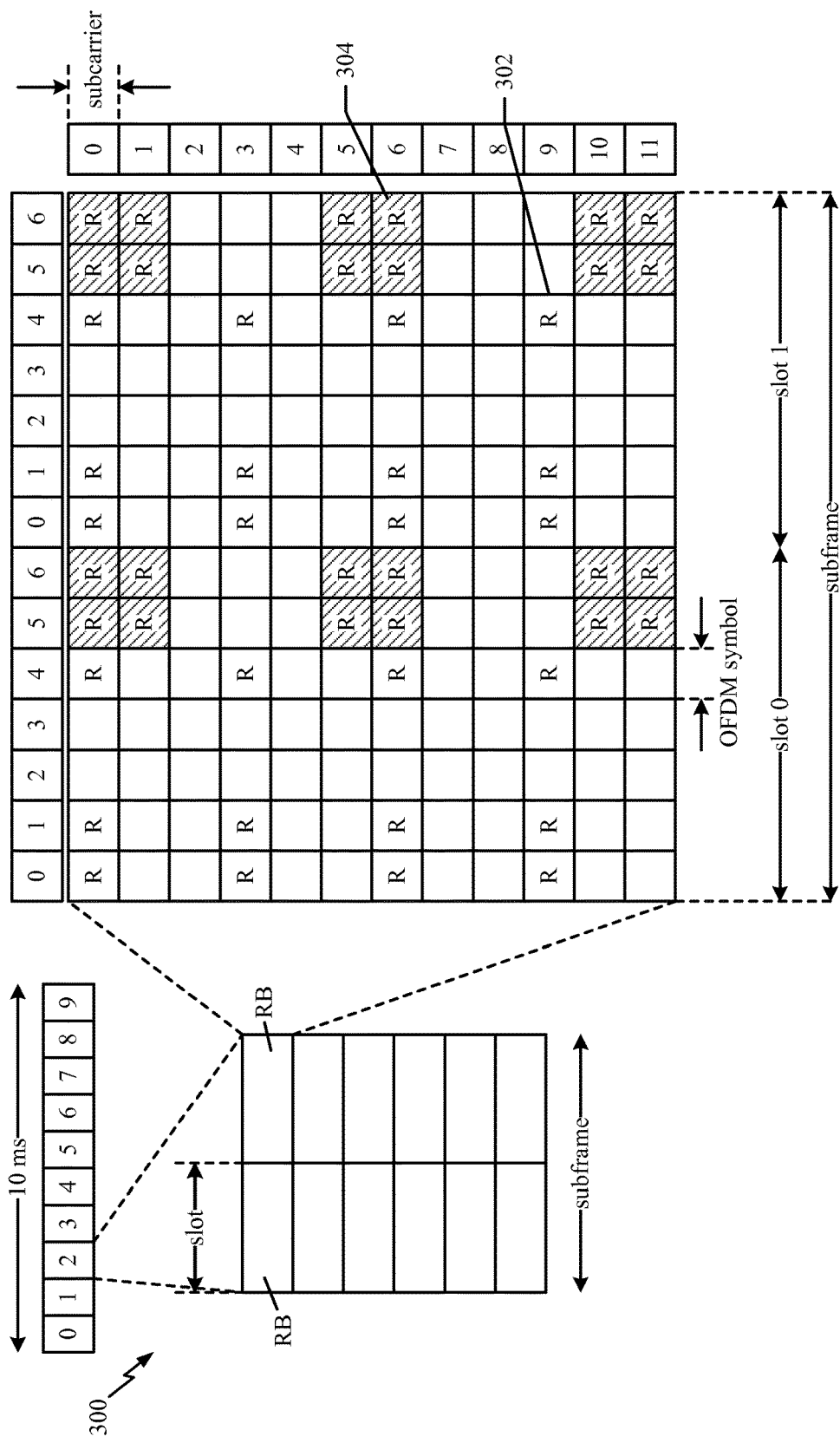
FIG. 3 is a diagram illustrating an example of a frame structure for use in an access network.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
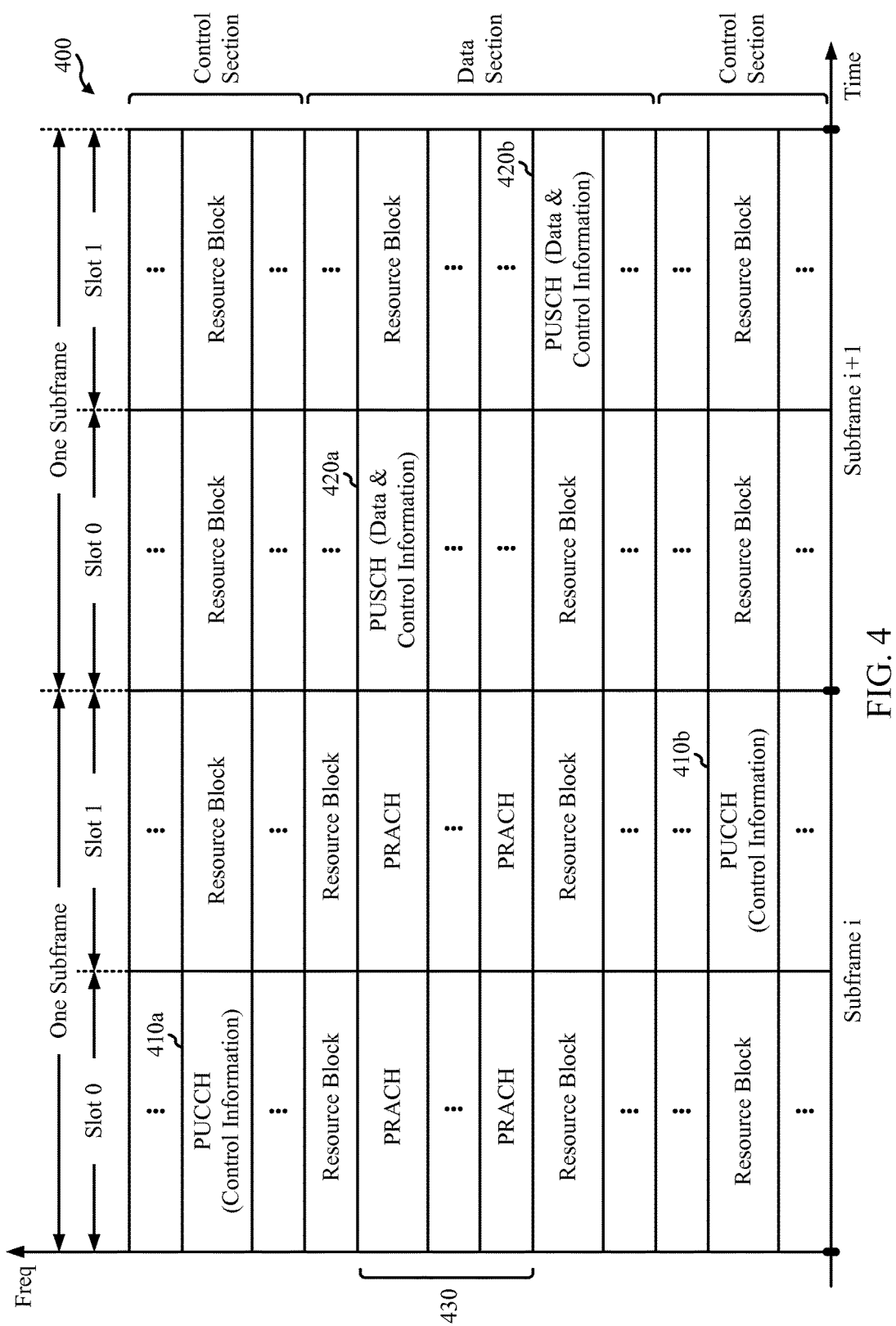
FIG. 4 shows an exemplary format for the UL in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size.

The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
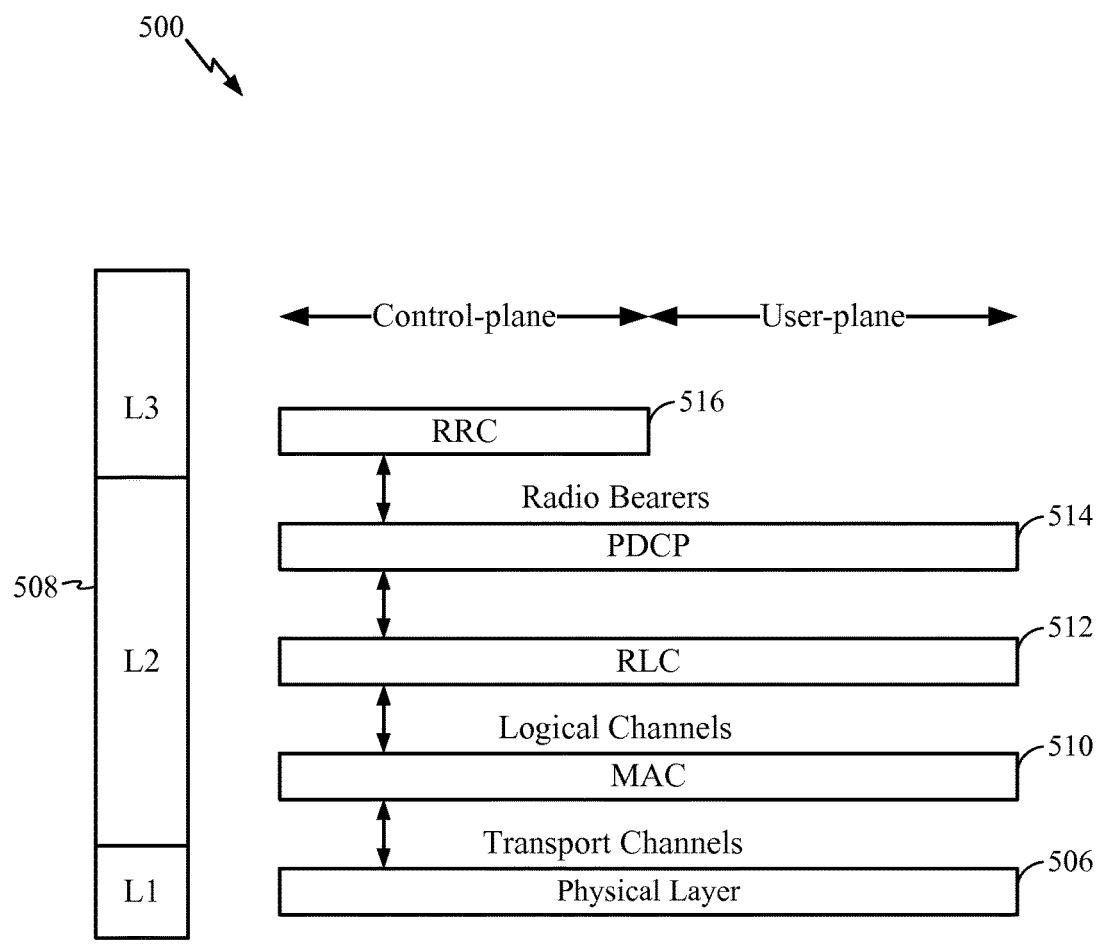
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
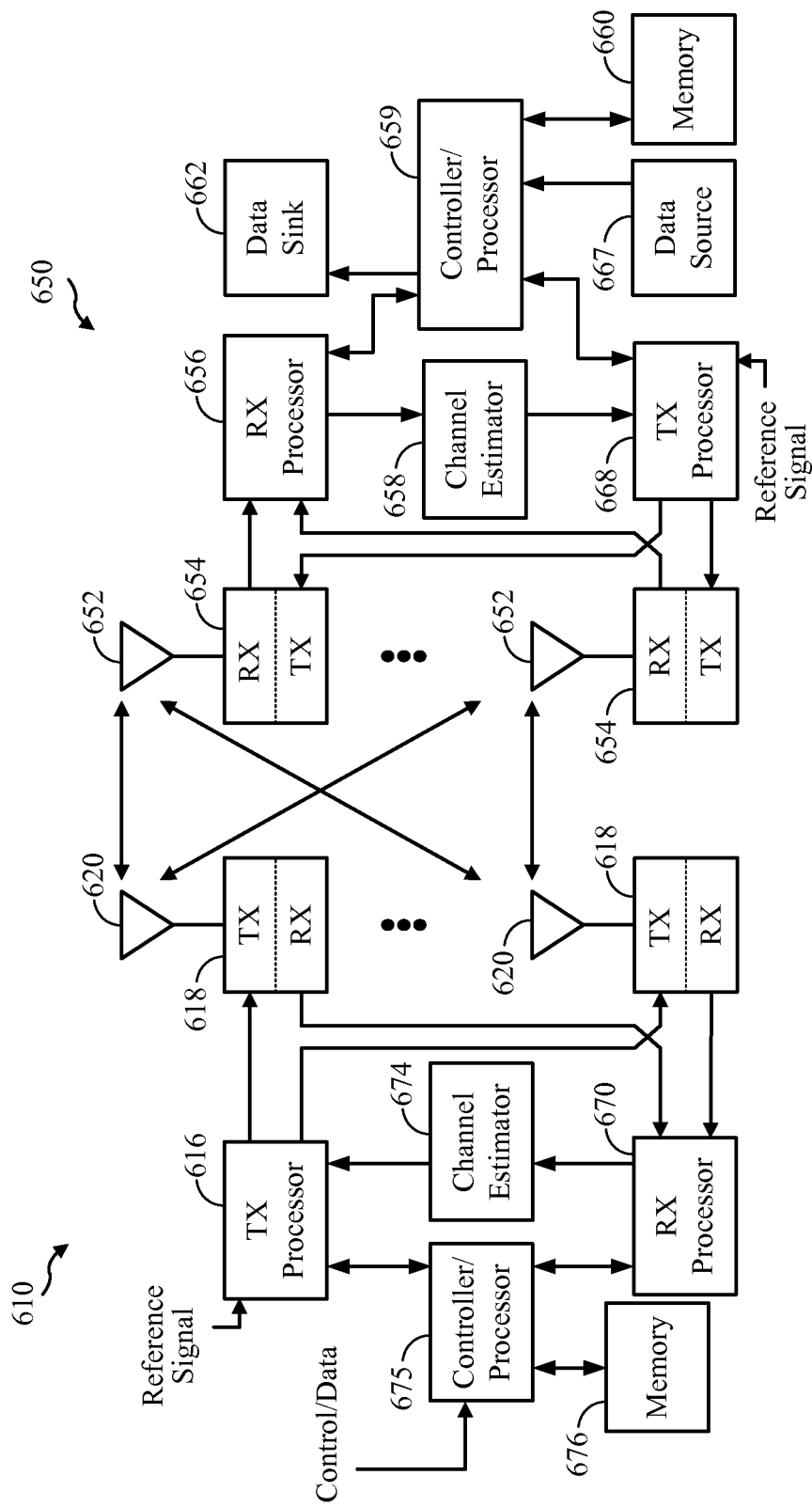
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
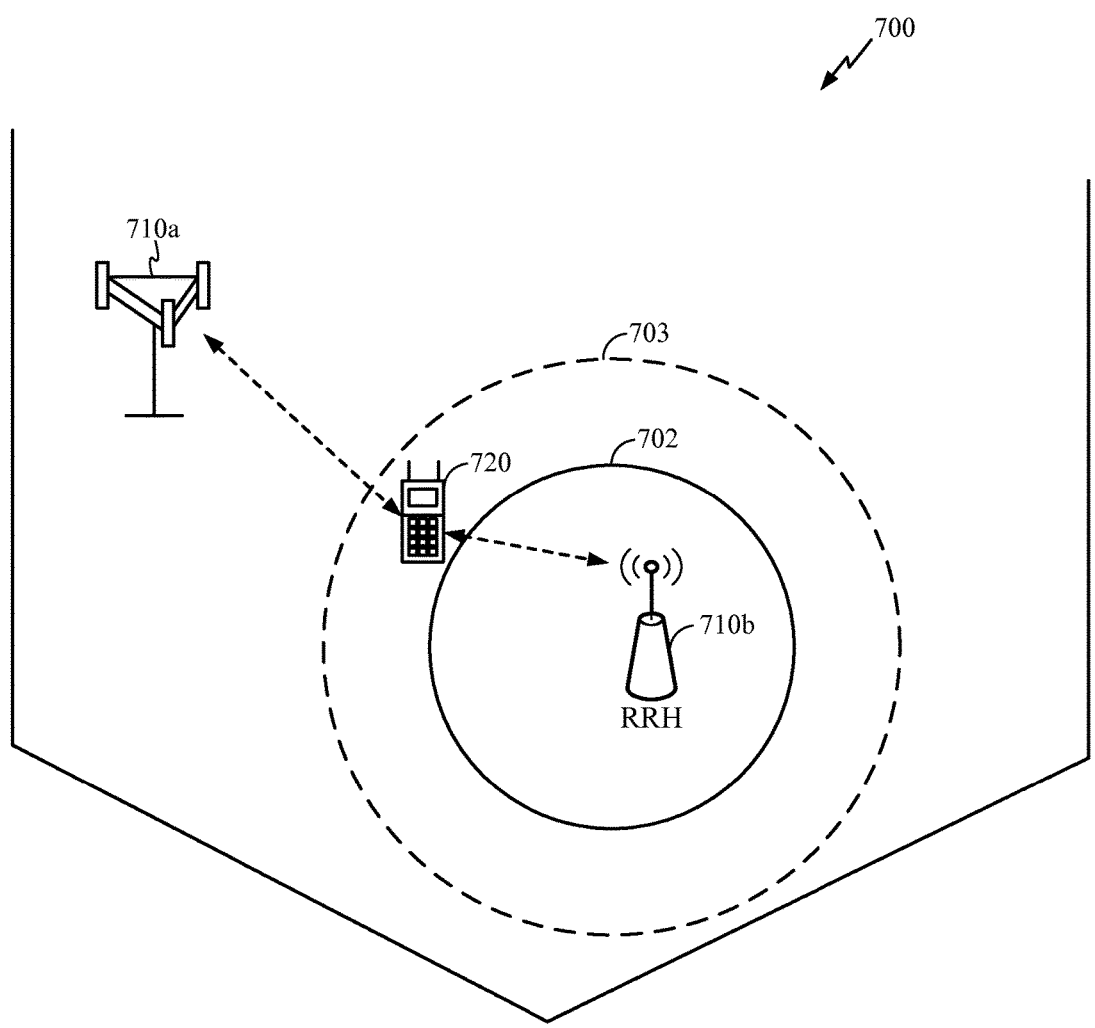
FIG. 7 is a diagram illustrating a range expanded cellular region in a heterogeneous network.

FIG. 7 is a diagram 700 illustrating a range expanded cellular region in a heterogeneous network. A lower power class eNB, such as the RRH 710b, may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703. By enabling the expanded range cellular region for RRH 710b, the network may be able to support a larger number of UEs by having the RRH 710b support a larger number of UEs in a larger area, allowing the eNB to serve more UEs in the cell outside of the range expanded cellular region 703.

Figure 8:
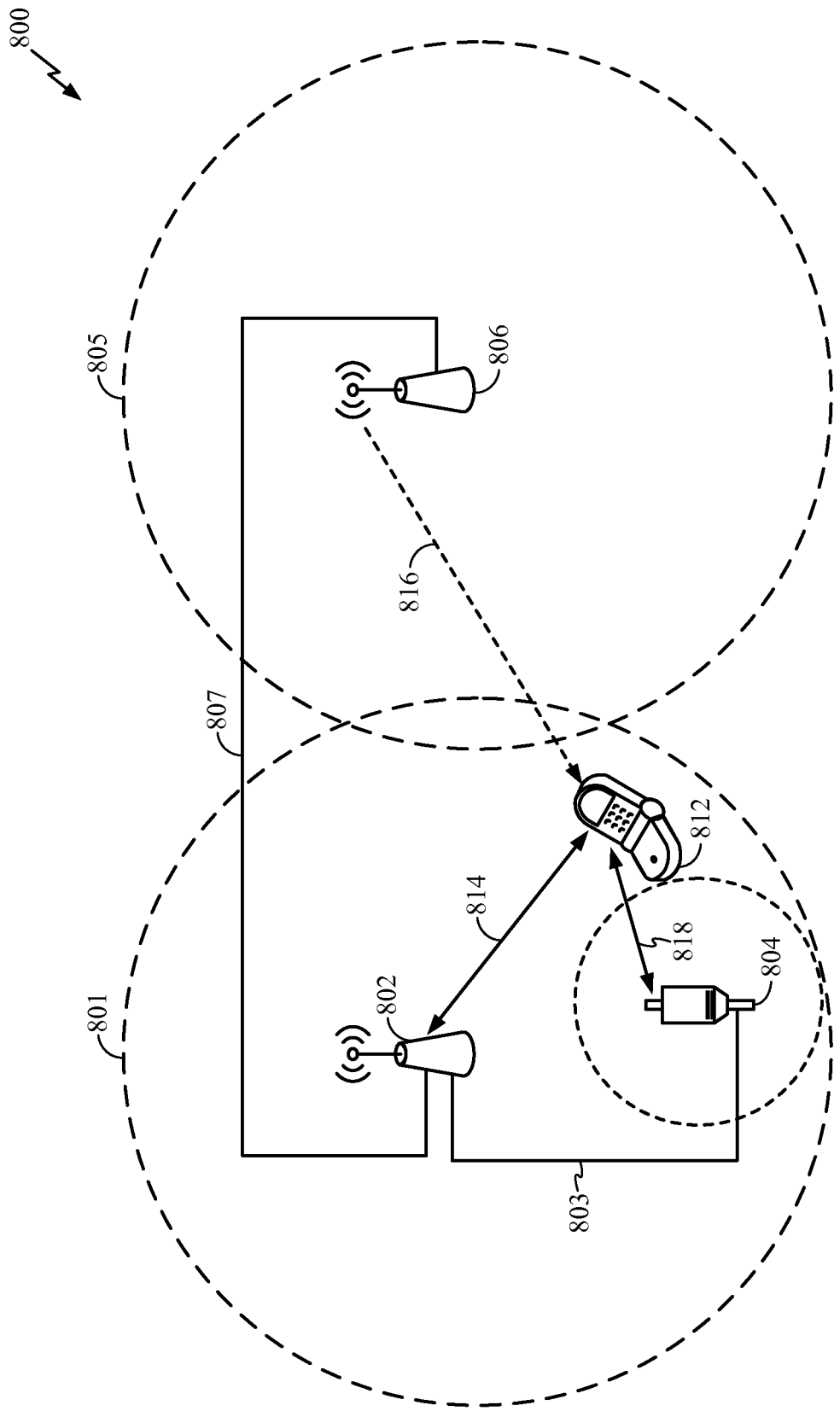
FIG. 8 is a diagram illustrating an example Macro eNB/RRH CoMP configuration in an access network.

FIG. 8 is a diagram illustrating an example Macro eNB and RRH configuration in access network 800. Access network 800 may include multiple clusters 801 of CoMP transmission points. A CoMP cluster 801 may include one or more macro eNBs 802 and one or more RRHs 804. As used herein, the CoMP cluster may be referred to as heterogeneous where entity 804 operates with reduced transmit power, and the CoMP cluster may be referred to as homogenous where entity 804 transmits with the same transmit power as another macro eNB. For both homogeneous and heterogeneous deployments, there may be one or more RRHs 804. In one aspect, macro eNB 802 and RRHs 804 may be connected to each other and to eNB 806 through fiber cable 803, X2 backhaul 807, etc. Generally, UE 812 may receive service from access network 800. According to certain aspects, UE 812 may access the network resources by accessing CoMP cluster 801. In one aspect, a CRS pattern is common across CoMP cluster 801, e.g., macro eNB 802 and RRHs 804 may transmit using a common CRS pattern. Further, access network 800 may include one or more other CoMP cluster 805 including one or more macro eNB/RRHs 806. In operation, CSI feedback may be obtained to assist UE 812 in communicating with macro eNB 802 and/or RRH 804 including information associated with interference 816 from another CoMP cluster 805.

In one aspect of UE 812, UE 812 may be enabled to use a wireless protocol for communications with the CoMP cluster 801. Such communication protocols may include, but are not limited to, LTE release 8, LTE release 9, LTE release 10, LTE release 11, etc. To provide service to UE 812, channel estimation parameters may be obtained for a channel 814 to potentially be used between UE 812 and macro eNB 802, and/or for a channel 818 between UE 812 and RRH 804, and interference estimation parameters may be obtained to measure interference 816. In one aspect, interference 816 may potentially originate from other RRHs 804, macro eNB 802, and/or other CoMP clusters 805. Various schemes for configuring resource element patterns for various resource pattern groups (e.g., CoMP clusters) to allow a UE to perform channel estimation and interference estimation are now presented.

Figure 9:
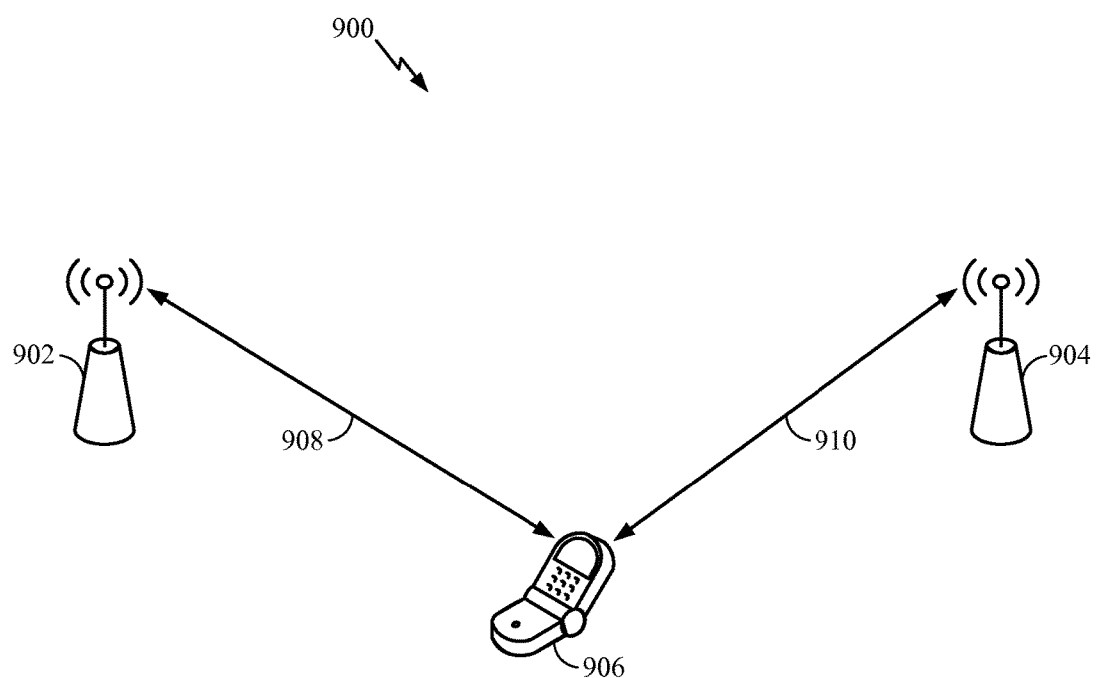
FIG. 9 is a diagram illustrating another example Macro eNB/RRH CoMP configuration in an access network.

FIG. 9 is a diagram illustrating an example access network 900 in which UE 906 may perform channel state measurements associated with multiple possible serving transmission points (902, 904). In one aspect, transmission points (902, 904) may be coordinated to operate as a CoMP cluster. Access network 900 may include support for multiple CoMP schemes including coordinated scheduling and/or coordinated beamforming, dynamic point selection (DPS), coherent and/or non-coherent joint transmission (JT), etc. Further, access network 900 may provide support for homogeneous and/or heterogeneous CoMP cluster operations.

In one aspect, CSI feedback reporting encompasses channel and interference measurement, both of which may be facilitated through a combination of reference signals, including one or more Channel State Information Reference Signals (CSI-RS) and one or more Common Reference Signal (CRS). As used herein, a CSI-RS may be differentiated into non-zero power and zero-power CSI-RS. The non-zero power CSI-RS may include actual pilot transmissions with non-zero power that may be received by a UE and used to measure channel and/or interference conditions. A UE may compare the received CSI-RS with its known form to determine the quality (e.g. strength, clarity, etc.) of the transmission channel. The zero-power CSI-RS, on the other hand, may represent one or more muted resource elements. Such muting may be used for interference measurement, in that any signals received during the time and on the same frequency of a zero-power CSI-RS are known to be interfering signals from another transmitter. Interference detected when receiving a non-zero power CSI-RS may be multi-path interference caused by reflections (from, e.g., buildings) of the CSI-RS. The configuration of both zero-power and non-zero power CSI-RS resources may be UE specific. Further, for a specific UE, multiple non-zero power CSI-RS resources and zero-power CSI-RS resources may be defined.

The CoMP schemes include CSI feedback reporting, which may include CSI reporting for multiple candidate transmission points for DPS. For coherent and/or non-coherent JT, multiple transmission points (e.g., 902, 904) may contemporaneously transmit to the UE. CSI feedback reporting may be performed aperiodically and/or periodically. Aperiodic feedback may be performed on a per-request basis. Such aperiodic feedback from a UE may be triggered in access network 900 through a grant to the UE on a physical downlink control channel (PDCCH). Aperiodic CSI feedback reporting may be transmitted by a UE using an uplink data transmission (e.g., on PUSCH), thereby allowing for larger payload transmissions than would be possible on the uplink control channel (e.g., PUCCH). Periodic feedback may include one or more reporting modes, and may follow a specific semi-statically configured timeline. Periodic CSI feedback reporting may be transmitted by a UE using the PUCCH, which allows for a more limited payload compared to the payload allowed for aperiodic feedback.

A UE may send multiple CSI feedback reports that are computed based on different sets of reference signal resources. Each CSI feedback report may include channel measurement, interference measurement, or any combination thereof. By reporting on multiple sets of reference signal resources, a UE may enable the network to determine channel quality as it varies over time and for various frequencies. Feedback reporting using different sets of reference signal resources is useful as these reference signals may be indicative of different candidate transmission alternatives from which the network may select. For example, in one aspect, the UE 906 may be served either by transmission point 902 or by transmission point 904 as part of a DPS scheme. In such an aspect, UE 906 may be configured to perform measurements associated with two separate non-zero power CSI-RS resources for channel measurement. Further, UE 906 may report two sets of CSI reports, each indicative for one of the serving alternatives. Similar to the above channel measurement options, the UE 906 may perform various interference measurements for the purpose of CSI feedback reporting (e.g., using various sets of zero-power CSI-RS resources when performing interference measurements).

Signaling for CSI measurement and reporting configurations may include use of one or more resource pattern groups. Multiple groups of reference signal patterns may be used and these groups may constitute separate feedback reporting instances for which CSI feedback is reported. CSI reports for different groups may be indicative of different configurations of channel and/or interference measurement. As such, CSI reports for different groups may differ substantially. For each resource pattern group, a first and a second resource element pattern may be considered. The first resource element pattern may be used for channel measurement and may use one or more non-zero power CSI-RS resources. In an optional aspect, usage of a CRS pattern may also be considered. The second resource element pattern may be used for interference measurement and may include zero-power CSI-RS resources and/or CRS. Non-zero power CSI-RS resources may also be used for interference measurement, e.g., after subtracting the known pilot transmissions. A UE may be informed of which CSI-RS resources to use through either explicit or implicit signaling, or a combination thereof. The first resource element pattern of different resource pattern groups may or may not correspond to the same CSI-RS resources. Similarly, the second resource element pattern of different resource pattern groups may or may not correspond to the same CSI-RS resources. For example, in one aspect, two resource pattern groups may be considered where both groups may have first resource element patterns that correspond to the same CSI-RS resources used for channel measurement while the groups may have different configurations for the second resource element pattern used for interference measurement.

Where explicit signaling is used, a UE may be signaled through a new field (in, e.g., a PDCCH) which CSI-RS resource(s) should be used. Further, where explicit (e.g., dedicated) signaling is used, interference measurement resources may be signaled separately from the channel measurement resources through a combination of RRC and/or dynamic signaling. In one aspect, dynamic signaling may complement RRC signaling. For example, a total of four CSI-RS, CRS, or other resources may be configured in RRC signaling, and dynamic signaling may include 2 bits; the 2 bits may indicate which of the RRC signaled resources a UE should measure.

Where implicit signaling is used, the UE 906 may infer the one or more CSI-RS resources to use from the subframe in which the report is requested. The UE 906 may then combine the channel and interference measurements (908, 910) associated with each of the multiple transmission points (902, 904) into a single CSI report for each transmission point (902, 904) that is conveyed to the network.

For aperiodic feedback, the index of the one or more configured CSI-RS resources may be signaled using dynamic signaling. In one aspect, a combination of RRC and dynamic signaling can be used to configure which channel/interference resource a UE should measure. As discussed supra, multiple groups of reference signal resources may be configured to enable CSI reporting indicative of different transmission alternatives. Each of these groups may include different channel and/or interference measurement resource patterns. Aperiodic reporting may include CSI computed based on different resource patterns for interference measurement. For example, even if a single reference signal pattern is configured for channel measurement, multiple CSI-RS resources may be configured for interference estimation in a reference subframe. A UE may generate separate aperiodic CSI feedback reports using these different resource patterns for interference measurement. Furthermore, where multiple resource pattern groups are measured, additional signaling may be used to convey to a UE whether to compute rank indication, precoding matrix, and channel quality (RI/PMI/CQI) for each group or whether to report a subset of RI/PMI/CQI in certain CSI feedback reports. For example, a UE may report all of RI/PMI/CQI for one group, but only CQI for another group. This might be used in situations in which a RRH is not using MIMO, and therefore does not need RI reported. In one aspect, the encoding of the CSI reports corresponding to different groups may be performed jointly to reduce feedback payload. For example, additional CQI reporting may be encoded as an offset (delta CQI) compared to an absolute CQI value in another report. Reporting an offset may enable CQI reporting while sending a smaller amount of data. In another aspect, additional CQI may be reported on a wideband and/or per-subband basis.

In another aspect, for aperiodic reporting, the reference resource may be defined based on the subframe in which the request for the aperiodic CSI reports was received. Basing the reference resource on the subframe in which the request was received may allow report requests to be sent in a smaller (in quantity of data) transmission. An additional offset may be applied to capture processing delays. For example, based on the subframe in which the request for an aperiodic CSI report is received, a reference resource subframe may be determined This determination may also depend on other parameters such as but not limited to what type of grant triggered the aperiodic feedback request. In line with the reference signal resource patterns that fall into the reference subframe, one or more CSI feedback reports may be sent by the UE. In one aspect, a UE may be subject to an upper limit on how many resource patterns may be reported. Limiting the quantity of resource patterns on which the UE reports conserves processing capacity and battery power at the UE, as well as uplink transmission resources. In such an aspect, this upper limit may be configured through RRC signaling.

For periodic feedback, the one or more CSI-RS resources may be signaled as part of a reporting mode configuration. In one aspect, periodic feedback may report different channel/interference measurement configurations in separate reporting instances. In such an aspect, configuration of CSI-RS resources for channel/interference measurement can be made part of a semi-static configuration of the reporting mode. By making a semi-static configuration of the reporting mode and CSI-RS resources, a network may conserve the downlink transmission resources which would be used signaling the reporting mode and resources to use. In another aspect, a UE may determine, at least partially, which reference signal pattern groups to report in a certain periodic feedback reporting instance. In such an aspect, a UE may report only the best (with respect to channel state information) reference signal pattern group at a time. A UE may indicate as part of the report which reference signal pattern group was reported. In another aspect, a UE may cycle across several combinations in a pattern that is part of the feedback reporting configuration. By doing so, a UE may report CSI for a large bandwidth and/or group of resources over time, while conserving UL transmission resources by not reporting on all resources in a single report.

Figure 10:
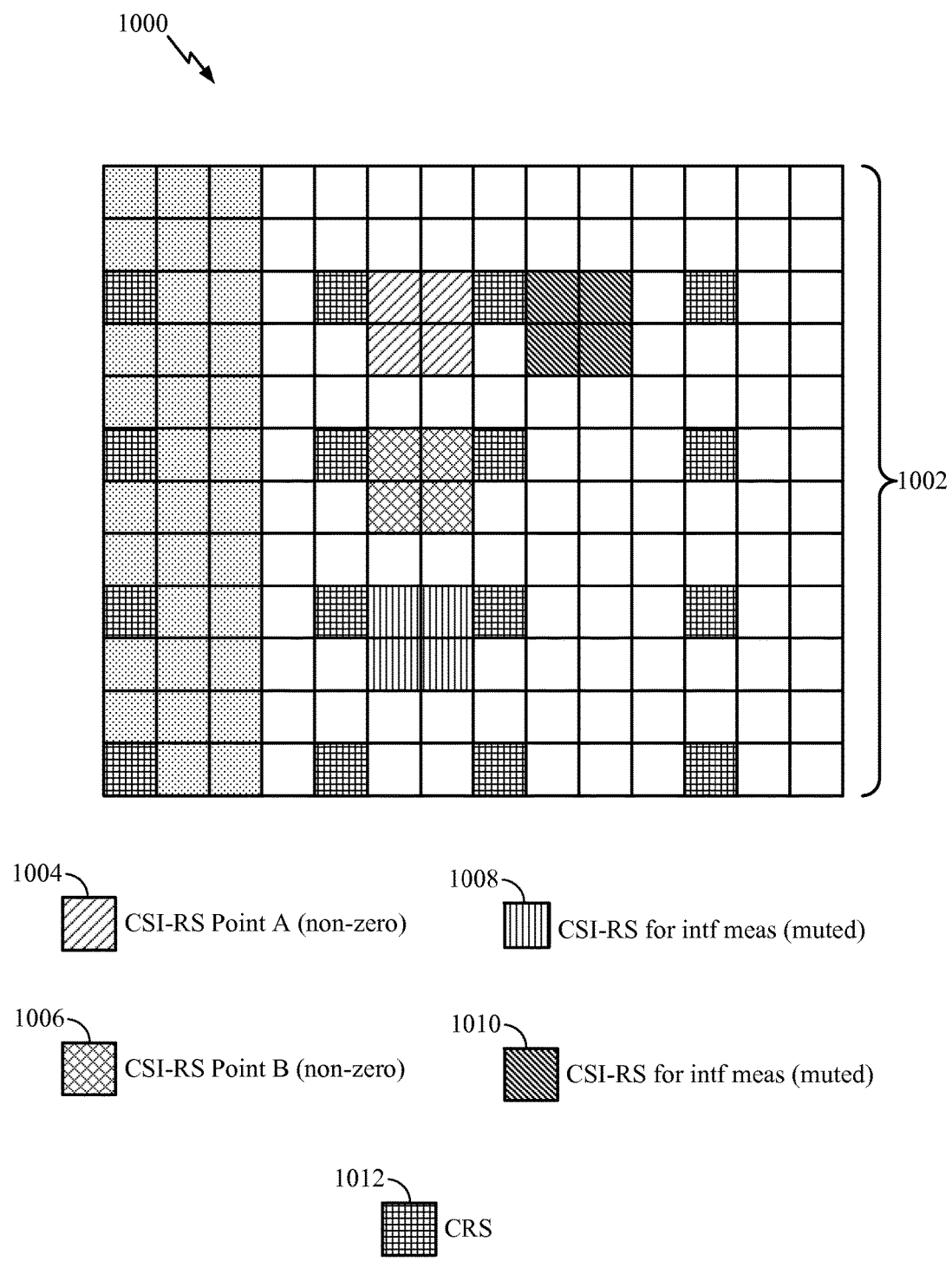
FIG. 10 is a diagram illustrating an example frame structure and resource element configuration to enable CSI measurements according to an aspect.
Figure 11:
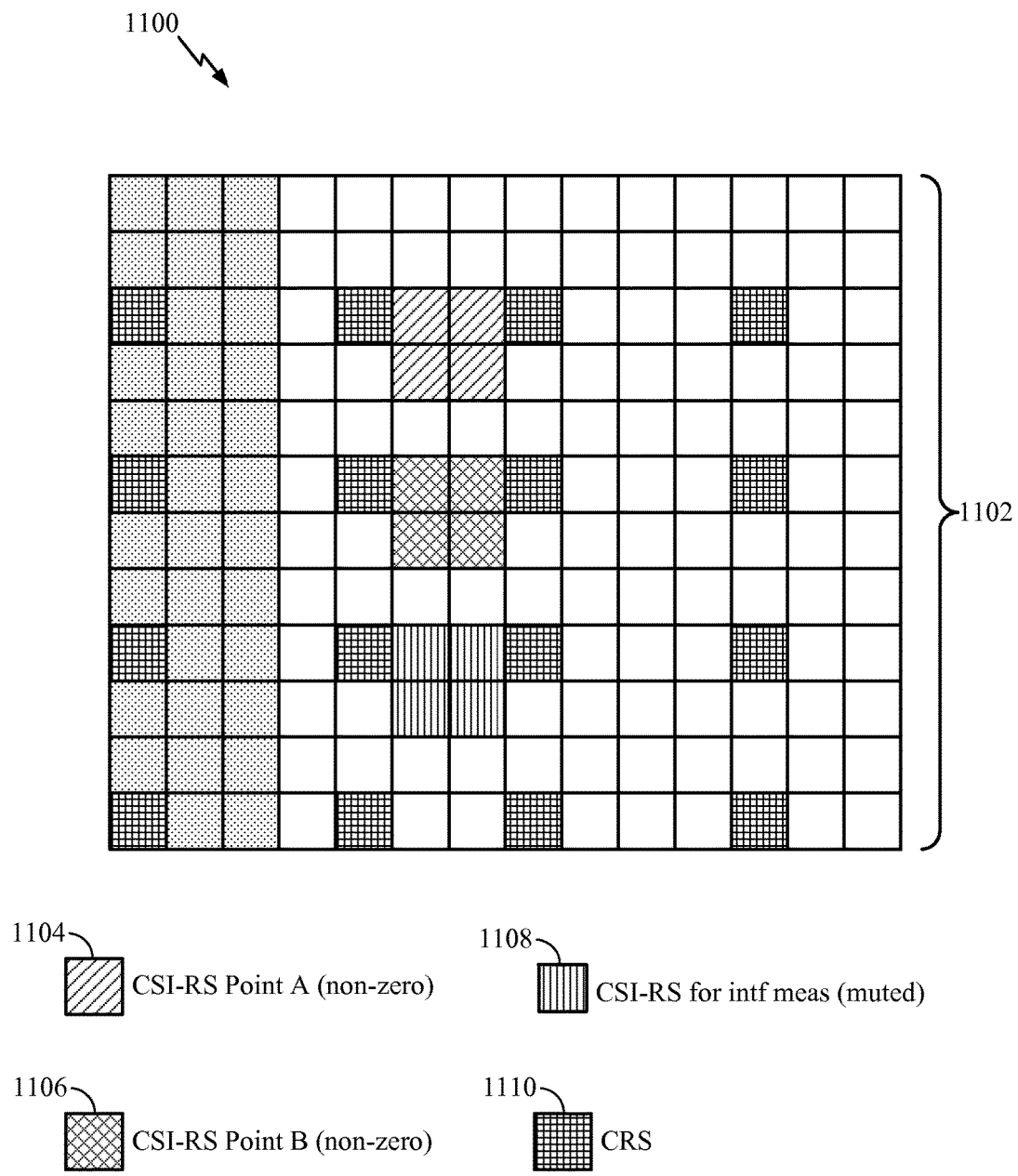
FIG. 11 is a diagram illustrating another example frame structure and resource element configuration to enable CSI measurements according to an aspect.

FIGS. 10 and 11 provide example CoMP schemes for CSI feedback reporting.

FIG. 10 is a diagram illustrating an example frame structure 1000 and resource element configuration 1002 to enable CSI measurements. Resource element configuration 1002 may include one or more resource elements 1004 allocated for channel estimation associated with a first transmission point (e.g., transmission point 902), one or more resources elements 1006 allocated for channel estimation associated with a second transmission point (e.g., transmission point 904), one or more resources elements 1008 allocated for interference estimation associated with a first transmission point (e.g., transmission point 902), one or more resources elements 1010 allocated for interference estimation associated with a second transmission point (e.g., transmission point 904), and one or more resources elements 1012 for a common reference signal (CRS).

Where CSI-RS resource configuration information is communicated through an implicit configuration, a linkage of channel and interference measurement resources implies that the interference measurement resources (1008, 1010) may be derived from the channel measurement resources (1004, 1006) configuration. In one aspect, implicit configuration may include mapping of channel and interference resources using a one-to-one mapping. In such an aspect, for any non-zero power CSI-RS resource for channel estimation (1004, 1006), there may be a dedicated interference measurement CSI-RS resource (1008, 1010). An interference measurement resource may be zero-power (e.g., muted) and/or non-zero power (e.g., not muted). Where the interference measurement resource is non-zero power, the UE (e.g., UE 906) may subtract one or more known pilot signals and use the resource elements for interference estimation. Subtracting the known non-zero power signals of the serving cell may allow the UE to accurately estimate interference from other sources. In such an aspect, separate signaling may convey to the UE pilot information, pre-coding information, etc.

In another aspect, implicit configuration may include mapping of channel and interference resources using a one-to-many mapping. In such an aspect, multiple muted CSI-RS resources may be assigned for interference estimation without introducing ambiguity. In other words, a mapping from each channel estimation measurement resource (1004) to the set of interference measurement resources (1008, 1010) could be a direct mapping. Further, non-zero power CSI-RS resources (1004, 1006) may be used to supplement interference estimation by subtracting one or more known pilots from resource elements initially allocated to channel estimation and reusing the resource elements for interference estimation, as discussed supra. In one aspect, mapping between channel measurement and interference measurement resource elements may differ depending on a subframe, subframe set, and/or subframe type.

As depicted in FIG. 10, feedback associated with a first transmission point (e.g., transmission point 902) may be obtained using resource element pattern 1004 for channel estimation and resource element pattern 1008 for interference estimation. Further, feedback associated with a second transmission point (e.g., transmission point 904) may be obtained using resource element pattern 1006 for channel estimation and resource element pattern 1010 for interference estimation. In one aspect, CRS 1012 may be used in combination with CSI-RS for interference estimation.

One of ordinary skill in the art would appreciate that although the above discussion refers to resource element patterns corresponding to individual transmission points, the disclosure also covers one or more other configurations. For example, the resource elements 1004, 1006 may not necessarily correspond to a first transmission point and second transmission point, respectively. Rather, in one aspect, a single resource element pattern 1004 may span more than a single transmission point. Further, the specific mapping of CSI-RS resource elements to transmission points may be transparent to the UE.

FIG. 11 is a diagram illustrating an example frame structure 1100 and resource element configuration 1102 to enable CSI measurements. Resource element configuration 1102 may include one or more resources elements 1104 allocated for channel estimation associated with a first transmission point (e.g., transmission point 902), one or more resources elements 1106 allocated for channel estimation associated with a second transmission point (e.g., transmission point 904), one or more resources elements 1108 allocated for interference estimation to be shared among multiple transmission points (e.g., transmission point 902, 904), and one or more resources elements 1110 for a common reference signal (CRS).

Interference measurement resources 1108 sharing among multiple channel measurement resources allows for reduced system overhead. In an aspect in which two transmission points (e.g., 902, 904) are neighboring points, the interference measured on 1108 may include interference from points other than these two. However, in such a case, if the feedback report for either transmission point is computed using the shared interference measurement resource 1108, interference from the other transmission point may not be measured as part of the report. This deficiency may be undesirable from a network perspective, as multiple transmission points may be active and may generate interference (e.g., one transmission point 902 may serve UE 906 while the other transmission point 904 may serve a different UE and may result in interference to UE 906). To avoid unaccounted for interference, interference from one or more other transmission points (e.g., 904) may be incorporated based on channel measurement resource patterns associated with each of the other transmission points by adding the one or more channel measurements to the interference measurement obtained from the dedicated interference measurement resource. When adding interference based on the channel measurement resource of the other transmission point, a pre-coder assumption may need to be made as the pilot present on the channel measurement resource may differ from the pre-coder that may eventually be assigned by the network. In one aspect, signaling may inform the UE (e.g., 906) what pre-coder assumption to use. For example, interference may be added using a full-rank (or hard-coded) pre-coder assumption, etc. In another aspect, each transmission point may offset the received CSI report based on scheduling decisions.

The above technique of "adding-back" interference may be applied in the cases other than where CSI-RS resources for interference estimation are shared among multiple transmission points. The method could be performed based on any non-zero power CSI-RS resource by indicating that the non-zero power CSI-RS represents an interference contribution and adding it to the interference estimate obtained from the dedicated interference measurement resources. The configuration of this procedure may be signaled explicitly through a combination of RRC and/or dynamic signaling. The implicit configuration options discussed above may be applied as well.

In another aspect, separate resources for each of the two channel measurement resources may not be needed, and instead common resources may be used. Interference based on the channel measurement resource of the other transmission point may be added for reporting purposes.

A user equipment (UE) may generate sounding reference signals (SRSs) that can facilitate uplink power control, uplink link adaptation and subband scheduling, time tracking, adaptive uplink antenna switching, downlink scheduling, and beamforming, and the like. SRS can be a physical signal that does not convey information provided from higher layers (e.g., protocol layers higher than a physical layer). Typically, SRS is not associated with a particular transmission via a physical uplink control channel (PUCCH) and/or physical uplink shared channel (PUSCH). For instance, SRS is typically not employed to facilitate coherent demodulation and decoding of uplink transmissions. Rather, a UE can transmit SRS on frequencies different from uplink data transmissions (e.g., PUCCH or PUSCH transmissions) to facilitate a base station to evaluate the uplink between the UE and the base station across an entire system bandwidth and/or a portion thereof.

Figure 12:
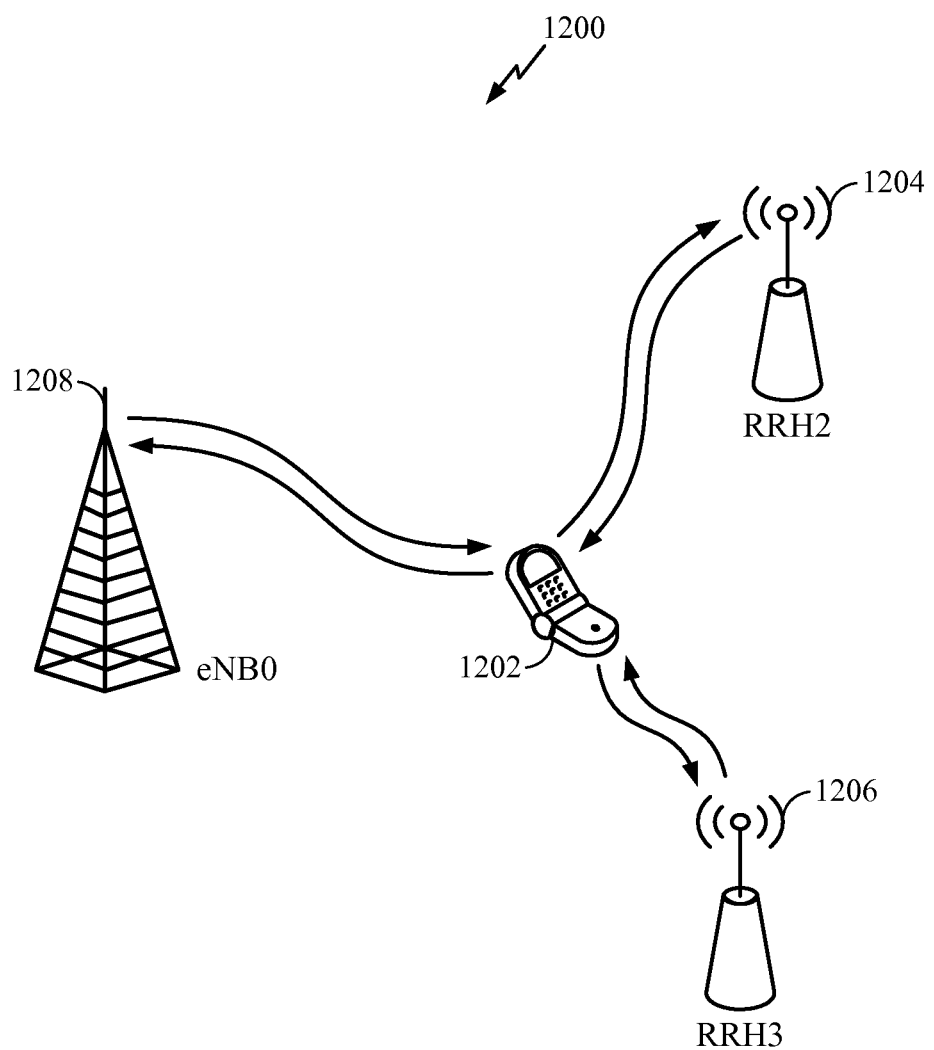
FIG. 12 illustrates an example access network in which UE may perform channel state measurements associated with multiple possible serving transmission points.

FIG. 12 illustrates an example access network 1200 in which UE 1202 may perform channel state measurements associated with multiple possible serving transmission points (e.g., RRH2 1204, RRH3 1206, eNB0 1208). In one aspect, the transmission points may be coordinated to operate as a CoMP cluster. For CoMP, an SRS channel may be used for both UL channel sounding as well as DL CoMP set determination. With regards to UL channel sounding, the UE 1202 may be associated with the RRH2 1204 for UL transmission. Therefore, the physical uplink shared channel (PUSCH), physical uplink control channel (PUCCH), periodic sounding reference signal (P-SRS), and aperiodic SRS (A-SRS) may be received primarily by RRH2 1204. In addition, PUSCH/P-SRS/A-SRS may be power controlled together with different initial open loop power settings.

For DL CoMP, SRS may potentially reach out to distant macro cells (e.g., eNB0 1208) to help in configuring the DL CoMP set. In such cases, the UL power control may need to be adjusted to allow the SRS to be received by the distant macro cell. A Rel-11 UE supports one periodic SRS power control (PC) process and one aperiodic SRS PC process, both tied to the PUSCH PC. Certain aspects of the present disclosure provide support for another A-SRS, which may have both a different initial power offset as well as an independent closed loop power control. By implementing the additional A-SRS with an independent power control, the UE is enabled to transmit an A-SRS which may be received by a distant macro cell (e.g., eNB0 1208) without affecting the SRS and power control for the UL signals directed to a nearby transmission point (e.g., RRH2 1204). The additional A-SRS may be used for DL CoMP set determination. According to an aspect, the difference in the power control for the two different A-SRS may include relying on an extended offset for the second A-SRS, with both of the A-SRS tied to a PUSCH PC. According to another aspect, the difference in the power control for the two different A-SRS may include relying on an extended offset for the second A-SRS, and the second A-SRS having a separate closed loop PC not tied to the PUSCH PC.

Certain aspects of the present disclosure provide techniques for triggering an additional SRS (e.g., CoMP SRS) in order to differentiate it from the A-SRS originally defined for UL channel sounding (e.g., UL SRS). Moreover, aspects of the present disclosure provide techniques for signaling closed loop power control for the additional (e.g., CoMP) SRS.

Figure 13:
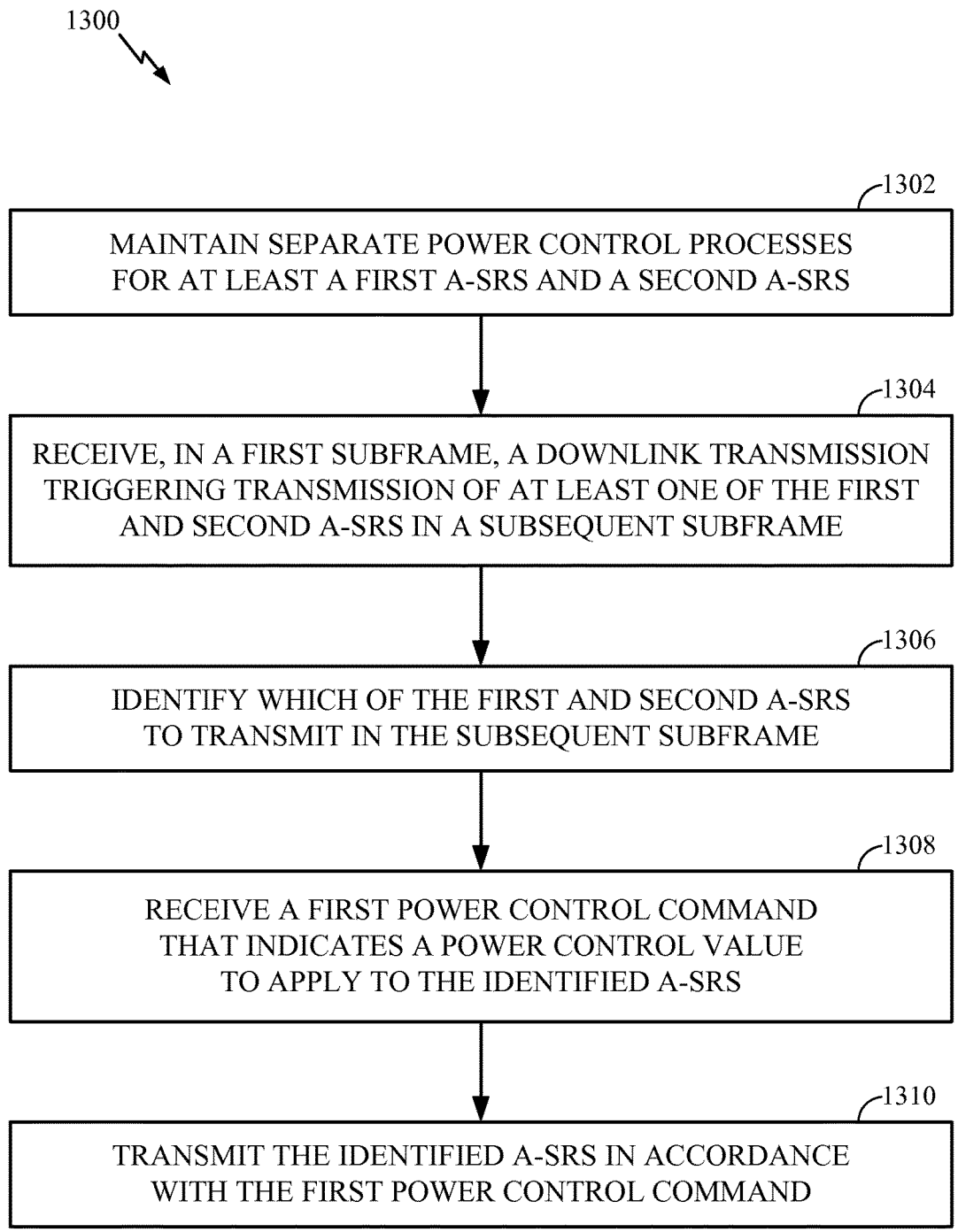
FIG. 13 illustrates example operations that may be performed, for example, by a UE, in accordance with certain aspects of the present disclosure.

FIG. 13 illustrates example operations 1300 that may be performed, for example, by a UE, in accordance with certain aspects of the present disclosure. At 1302, the UE may maintain separate power control processes for at least a first A-SRS and a second A-SRS. At 1304, the UE may receive, in a first subframe, a downlink transmission triggering transmission of at least one of the first and second A-SRS in a subsequent subframe. At 1306, the UE may identify which of the first and second A-SRS to transmit in the subsequent subframe. For certain aspects, the subsequent subframe generally includes a next available subframe that is designated for transmitting A-SRS, and the identified A-SRS generally includes an A-SRS associated with that subframe. At 1308, the UE may receive a first power control command that indicates a power control value to apply to the identified A-SRS. At 1310, the UE may transmit the identified A-SRS in accordance with the first power control command.

A UE may receive downlink transmissions triggering transmission of an A-SRS. A downlink transmission triggering transmission of an A-SRS may be one of at least two types, type 0 and type 1. Type 0 generally includes higher layer signaling (e.g., for P-SRS), and type 1 generally includes UL or DL downlink control information (DCI) formats (e.g., for A-SRS). A SRS triggering transmission may include SRS configuration information. A SRS configuration generally includes information regarding transmission comb, starting physical resource block assignment, duration (e.g., single or indefinite until disabled for trigger type 0), SRS-configuration index for periodicity and subframe offset, SRS bandwidth, frequency hopping bandwidth, cyclic shift, and number of antenna ports.

Type 1 SRS for UL channel sounding may be triggered by DCI formats 0/4/1A/2B/2C. DCI formats 0 and 4 may schedule PUSCH for a UE. A SRS request field may be present in DCI mapped to a UE specific search space which schedule PUSCH. With regards to DCI format 0, one set of SRS parameters may be configured by higher layer signaling. There may be a SRS request field of 1 bit, which a UE may interpret as a requesting transmission or no transmission of a SRS, depending on its value. With regards to DCI format 4, three sets of SRS may be configured by higher layer signaling. The SRS request field in the DCI may be two bits, and the UE may interpret each of the four possible values as requesting either no SRS or one of the three configured sets of SRS.

DCI formats 1A/2B/2C may schedule PDSCH for a UE. A SRS request field may be present in DCI scheduling PDSCH which are mapped onto the UE specific search space given by the C-RNTI. With regards to DCI format 1A/2B/2C, one set of SRS parameters may be configured by higher layer signaling. There may be a SRS request field of 1 bit, which a UE may interpret as a requesting transmission or no transmission of a SRS, depending on its value. DCI format 2B/2C may be present for TDD.

The setting of the UE transmit power $P_{SRS,c}(i)$ for an SRS transmitted in cell c in subframe i may depend on a SRS initial power offset $P_{SRS\_OFFSET,c}(m)$, a bandwidth in resource blocks of the SRS transmission $M_{SRS,c}$, and PUSCH power control parameters $P_{O\_PUSCH,c}(j)$, path loss compensation $\alpha_c(j)$, and closed loop power control command $f_c(i)$. The UE transmit power may be set by this equation:

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}$$

where $P_{CMAX,c}$ is the configured UE maximum output power for serving cell c, $P_{SRS\_OFFSET,c}(m)$ is a 4-bit parameter semi-statically configured by higher layers for m=0 and m=1 for a serving cell c. For an SRS transmission given trigger type 0, then m=0 (e.g., periodic SRS). For an SRS transmission given trigger type 1, then m=1 (e.g., aperiodic SRS). For $K_S$=1.25, $P_{SRS\_OFFSET,c}(m)$ may have a 1 dB step size in the range [−3, 12] dB. For $K_S$=0, $P_{SRS\_OFFSET,c}(m)$ may have a 1.5 dB step size in the range [−10.5, 12] dB. $K_S$ is given by the UE specific parameter deltaMCS-Enabled set by higher layers.

Power control commands for PUSCH/P-SRS/A-SRS may be sent in PDCCH scheduling uplink transmissions, such as downlink control information (DCI) format 0 for SIMO, which may include a 2 bit power control command field, or DCI format 4 for MIMO. Power control commands for PUCCH may be sent in PDCCH scheduling downlink transmissions, such as DCI format 1, DCI format 1A, or DCI format 1B/1D/2/2A/2B/2C, each of which may include a 2 bit power control command field. With regards to DCI format 1A, for a cyclic redundancy check (CRC) scrambled by a random access radio network temporary identifier (RA-RNTI), a paging-RNTI (P-RNTI), or a system information-RNTI (SI-RNTI), these bits may be used to indicate column N_PRB_1A in a transport block size (TBS) table. In addition to the transmitter power control (TPC) commands that are sent with UL or DL grants, DCI format 3 may include a 2 bit power control command field and DCI format 3A may include a 1 bit power control command field. DCI format 3 may include a TPC index provided by higher layer signaling for a UE (e.g., TPC command number).

For certain aspects, radio resource control (RRC) signaling may define a first set of subframe configurations for A-SRS for DL CoMP (e.g., CoMP SRS) and a second set of subframe configurations for A-SRS for UL channel sounding (e.g., UL SRS). In another aspect, RRC signaling may specify that A-SRS in one set of subframes will always be DL CoMP SRS, while A-SRS in all remaining subframes will always be UL SRS. For type 0 triggering (e.g., configured by higher layer signaling), different power offsets and subframe configurations for the two A-SRS may be included. For type 1 triggering, at least DCI formats 0, 4, 1A, 2B, or 2C may be used, but higher layer signaling may define at least the subframes used for CoMP SRS and/or subframes used for UL SRS (subframe-based triggering). A UE may follow the trigger that is the closest to the A-SRS subframe, subject to a processing timing constraint, as will be illustrated in the following figure.

Figure 14:
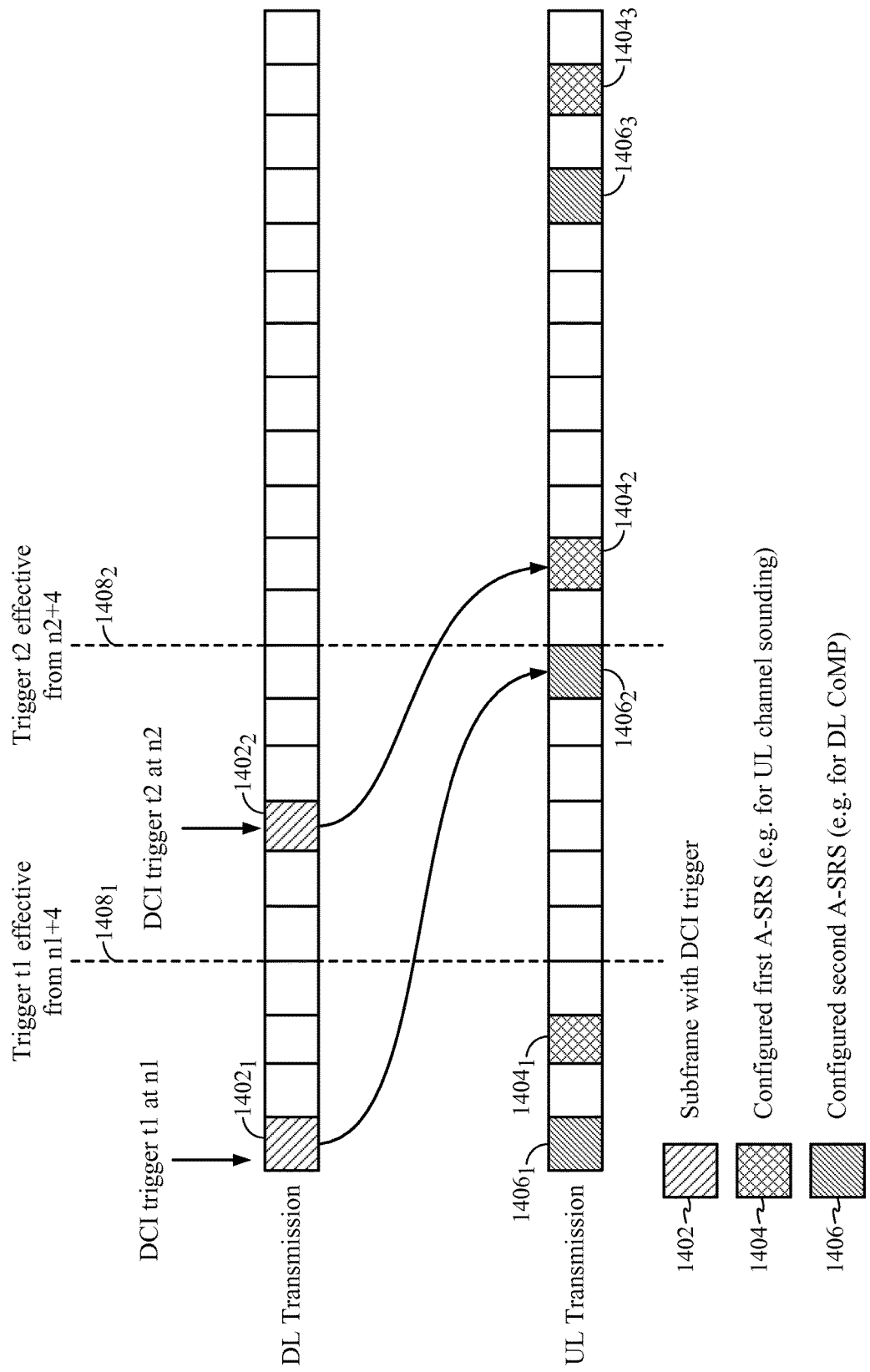
FIG. 14 illustrates an example of subframe-based triggering, in accordance with certain aspects of the present disclosure.

FIG. 14 illustrates an example of subframe-based triggering, in accordance with certain aspects of the present disclosure. As mentioned above, subframes may be configured via higher layer signaling to be used for either CoMP SRS 1406 or UL SRS 1404. Transmission of an A-SRS may be triggered by receipt of a downlink transmission (e.g., DCI trigger 1402). However, time may be taken to process the DCI trigger (e.g., four subframes). Referring to FIG. 14, DCI trigger 1402$_1$ may not apply to UL SRS 1404$_1$, because it may take at least four subframes to process DCI trigger 1402$_1$. The end of the time needed for processing the DCI is indicated at 1408$_1$. Therefore, the next A-SRS subframe after processing time 1408$_1$ is CoMP SRS 1406$_2$. With regards to DCI trigger 1402$_2$, the next A-SRS subframe after processing time 1408$_2$ is UL SRS 1404$_2$. Therefore, the CoMP SRS may be triggered appropriately, such that a UE may be able to differentiate downlink transmissions triggering transmission of CoMP SRS from downlink transmissions triggering transmission of UL SRS.

According to certain aspects, PUSCH/SRS power control may be tied together, and the power control commands may be sent by UL grants with DCI format 0/4. According to these aspects, as long as there is an UL grant and an intended PUSCH transmission, the power control bits may be applied to PUSCH. Power control for periodic SRS and the first A-SRS, UL SRS, may continue to be tied to power control for PUSCH. By tying power control for the first A-SRS and UL SRS to PUSCH power control, legacy UEs may continue to be supported. According to certain aspects, PUCCH power control may be signaled by DL grants with DCI format 1/1A/1B/1D/2/2A/2B/2C. By doing so, PUCCH performance may not be hindered by the additional SRS, and legacy UEs may continue to be supported. According to certain aspects, DCI format 3/3A may be used when there are no DL or UL grants (e.g., semi-persistent scheduling (SPS)).

According to certain aspects, DCI format 3/3A may be used for the second A-SRS for CoMP (e.g., CoMP SRS). In order to differentiate between the two power control processes (e.g., for UL SRS and CoMP SRS), explicit or implicit DCI format 3/3A mapping may be utilized. With regards to explicit DCI format 3/3A mapping, an additional power control index may be defined by RRC signaling for the second A-SRS. Therefore, when DCI format 3/3A is transmitted, there may be an explicit indication of which PC process the signal is intended for. According to certain aspects, certain parameters may be defined (e.g., TPC_PUSCH_RNTI, TPC_SRS_RNTI) for RRC signaling to support explicit DCI format 3/3A mapping.

With regards to implicit DCI format 3/3A mapping, a mapping scheme may be defined and application of DCI format 3 power control may depend on the scheme. For both explicit and implicit DCI format 3/3A mapping, PC bits may be remapped for A-SRS in group power control DCI format 3/3A, such that each PC bit may correspond to a different size for the second A-SRS process.

Figure 15:
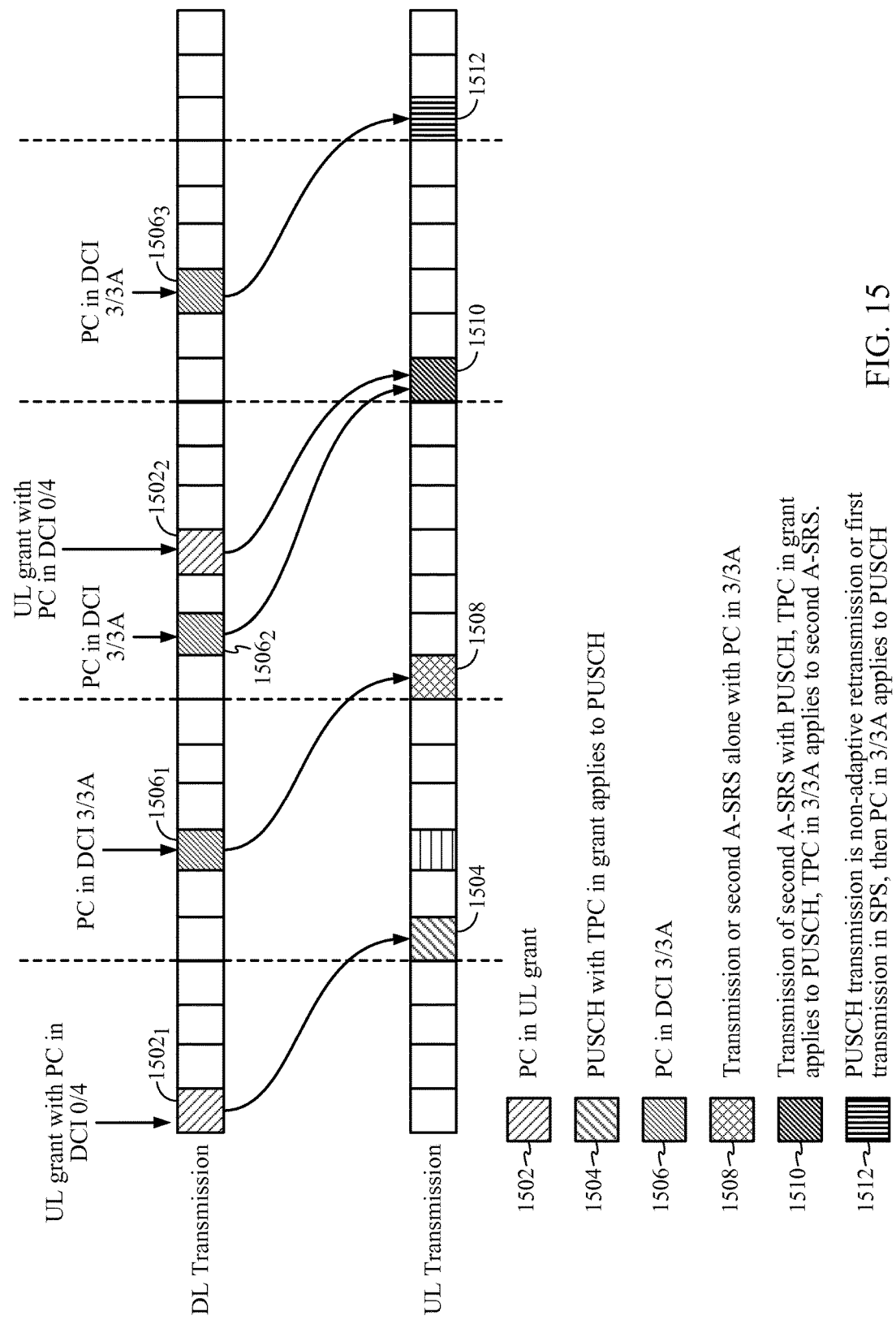
FIG. 15 illustrates an example of implicit DCI format 3/3A power control, in accordance with certain aspects of the present disclosure.

FIG. 15 illustrates an example of implicit DCI format 3/3A power control, in accordance with certain aspects of the present disclosure. According to these aspects, if a UE is expected to transmit A-SRS and PUSCH at subframe n and the UE receives a unicast transmission power control (TPC) only from an UL grant ($1502_1$), the UE may apply the TPC for the first A-SRS for UL channel sounding as well as PUSCH (1504). However, if a UE receives DCI format 3/3A ($1506_2$) and unicast power control ($1502_2$), the UE may apply the TPC from DCI format 3/3A to the second A-SRS for CoMP, and apply the TPC from unicast to PUSCH/SRS (1510) (e.g., for the first A-SRS for UL channel sounding). If the UE receives only DCI format 3/3A ($1506_3$), which may occur if there is a semipersistent scheduling (SPS) grant for the PUSCH, or a non-adaptive retransmission, the UE may apply the TPC to the first A-SRS for UL channel sounding as well as to the PUSCH (1512).

If a UE is expected to transmit A-SRS and no PUSCH at subframe n and the UE receives only DCI format 3/3A ($1506_1$), the UE may apply the TPC from 3/3A for the second A-SRS for CoMP (1508). Therefore, if there is no PUSCH, or if there is a control channel for an UL grant, DCI format 3/3A TPC may be applied to the second A-SRS for CoMP.

In the current specification, when trigger type 0 is used for periodic SRS, either one or indefinite SRS transmissions may be triggered. According to certain aspects, a new type 2 signaling may be introduced for the additional A-SRS (e.g., CoMP SRS), wherein an eNB may trigger one or a definite number of transmissions of A-SRS. According to these aspects, the triggering may be based on RRC signaling, and no dynamic signaling may be required. The number of A-SRS in the trigger may typically be one, but may also be extended. In these aspects, the frequency location of the A-SRS when multiple A-SRS are triggered may vary to allow for frequency hopping.

According to certain aspects, identifying the additional CoMP SRS may be based on a control channel that is used for SRS triggering or power control. For example, a control channel received in an enhanced PDCCH (ePDCCH) may apply to one A-SRS (e.g., UL SRS), while a control channel received in a PDCCH may apply to another A-SRS (e.g., CoMP SRS). According to another aspect, a control channel received in a localized ePDCCH may apply to one A-SRS, while a control channel received in a distributed PDCCH may apply to another A-SRS.

According to certain aspects, identifying the additional CoMP SRS may be based on a search space that is used (e.g., common search space vs. UE specific search space). For example, a control channel received in a common search space may apply to one A-SRS (e.g., UL SRS), while a control channel received in a UE specific search space may apply to another A-SRS (e.g., CoMP SRS).

According to certain aspects, the additional CoMP SRS triggering and power control may be dependent on a scrambling identification (SC_ID) in DCI format 2B/2C. For example, a PC received in a DCI format 2B/2C scrambled with a first RNTI may apply to one A-SRS (e.g., UL SRS), while a PC received in a DCI format 2B/2C scrambled with a second RNTI may apply to another A-SRS (e.g., CoMP SRS).

According to certain aspects, identifying the additional CoMP SRS may be dependent on DCI formatting. According to one aspect, DCI format 1A may apply to one set of A-SRS (e.g., UL SRS), and DCI format 2B/2C may apply to the other set of A-SRS (e.g., CoMP SRS). According to another aspect, DCI format 0 may apply to one set of A-SRS (e.g., UL SRS), and DCI format 4 may apply to the other set of A-SRS (e.g., CoMP SRS). According to yet one more aspect, DL DCI may apply to one set of A-SRS (e.g., CoMP SRS), and UL DCI may apply to the other set of A-SRS (e.g., UL SRS) for triggering.

According to certain aspects, identifying the additional CoMP SRS may be dependent on an aggregation level. For example, a PC received in a DCI referring to aggregation level 1 may apply to one set of A-SRS (e.g., UL SRS), while a PC received in a DCI referring to aggregation level 2 may apply to the other set of A-SRS (e.g., CoMP SRS).

According to certain aspects, the PC may be reinterpreted for A-SRS. According to one aspect, if a DL DCI is used, the PC may be reinterpreted as applying to an A-SRS instead of PUCCH, while if an UL DCI is used, the PC may be reinterpreted as applying to A-SRS instead of PUSCH.

According to certain aspects, with regards to RRC configuration, if there is a collision between transmissions, priorities may be defined between the two sets of A-SRS and one set may be dropped, or treated as an error configuration. For example, if a UE is scheduled to transmit both an UL A-SRS and a CoMP A-SRS, the CoMP A-SRS may be defined to be higher priority, and the CoMP A-SRS is transmitted, while the UL A-SRS is not transmitted.

According to certain aspects, two sets of virtual cell IDs may be defined for the two A-SRS processes, and the A-SRS trigger and power control may be linked to the two virtual cell IDs. For example, a PC received which refers to the first virtual cell ID may apply to one set of A-SRS (e.g., UL SRS), while a PC received which refers to the second virtual cell may apply to the other set of A-SRS (e.g., CoMP SRS).

According to certain aspects, rather than defining an additional A-SRS, an additional periodic SRS (P-SRS) may be defined. In other words, two P-SRS may be specified instead of two A-SRS, both P-SRS being upper layer configured.

According to certain aspects, in case multiple DL power controls are accumulated for the UL PUCCH transmission in TDD when the cell is not configured for CA, the multiple power controls may be decoupled to signal some for PUCCH and some for A-SRS. According to one aspect, the TPC for downlink assignment index (DAI)=1 may apply to PUCCH, while the TPC for DAI>1 may apply to A-SRS.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications at a user equipment (UE), comprising:
maintaining separate power control processes for at least a first aperiodic sounding reference signal (A-SRS) and a second A-SRS, wherein the power control process for the first A-SRS comprises a first closed loop power control process and the power control process for the second A-SRS comprises a second closed loop power control process independent of the first closed loop power control process;
receiving, in a first subframe, a first downlink transmission triggering transmission of the first or second A-SRS in a subsequent subframe;
identifying which of the first or second A-SRS to transmit in the subsequent subframe, wherein the identified A-SRS comprises A-SRS for uplink channel sounding;
receiving a second downlink transmission triggering transmission of another A-SRS in the subsequent subframe, said another A-SRS comprising A-SRS for downlink coordinated multipoint (CoMP) set determination;
receiving a first power control command that indicates a power control value to apply to the identified A-SRS;
receiving a second power control command that indicates a power control value to apply to said another A-SRS in the subsequent subframe, wherein if the first power control command is received in an uplink grant, and wherein if the second power control command is received in accordance with downlink control information (PCI) format 3/3A for a subframe where the UE is expected to transmit a physical uplink shared channel (PUSCH) and a CoMP A-SRS, further comprising:
applying the first power control command to the identified A-SRS for uplink channel sounding and PUSCH; and
applying the second power control command to said another A-SRS for downlink CoMP set determination; and
transmitting the identified A-SRS in accordance with the first power control command.

2. The method of claim 1, further comprising receiving signaling indicating which subframes are designated for transmitting which A-SRS.

3. The method of claim 2, wherein the indication of which subframes are designated for which A-SRS is identified via higher layer signaling.

4. The method of claim 1, wherein:
the subsequent subframe comprises a next available subframe that is designated for transmitting A-SRS; and
the identified A-SRS comprises an A-SRS associated with that subframe.

5. The method of claim 4, wherein the next available subframe that is designated for transmitting A-SRS is separated from the first subframe by at least a fixed number of subframes.

6. The method of claim 1, wherein the identified A-SRS is identified via higher layer signaling.

7. The method of claim 1, wherein a frequency of the multiple subsequent subframes is different to allow frequency hopping.

8. The method of claim 1, wherein the identifying is based on a type of control channel.

9. The method of claim 8, wherein the identifying is based on a search space type of the control channel that is used.

10. The method of claim 1, wherein the identifying is based on a downlink control information (DCI) format that is used for SRS triggering and power control command.

11. The method of claim 1, wherein the identifying is based on an aggregation level used for the downlink transmission.

12. The method of claim 1, wherein the identifying is based on a defined priority between the first and second A-SRS.

13. The method of claim 1, wherein the downlink transmission indicates multiple subsequent subframes for triggering transmission of the second A-SRS.

14. An apparatus for wireless communications by a user equipment (UE), comprising:
means for maintaining separate power control processes for at least a first aperiodic sounding reference signal (A-SRS) and a second A-SRS, wherein the power control process for the first A-SRS comprises a first closed loop power control process and the power control process for the second A-SRS comprises a second closed loop power control process independent of the first closed loop power control process;
means for receiving, in a first subframe, a first downlink transmission triggering transmission of the first or second A-SRS in a subsequent subframe;
means for identifying which of the first or second A-SRS to transmit in the subsequent subframe, wherein the identified A-SRS comprises A-SRS for uplink channel sounding;
means for receiving a second downlink transmission triggering transmission of another A-SRS in the subsequent subframe, said another A-SRS comprising A-SRS for downlink coordinated multipoint (CoMP) set determination;
means for receiving a first power control command that indicates a power control value to apply to the identified A-SRS;
means for receiving a second power control command that indicates a power control value to apply to said another A-SRS in the subsequent subframe, wherein if the first power control command is received in an uplink grant, and wherein if the second power control command is received in accordance with downlink control information (PCI) format 3/3A for a subframe where the UE is expected to transmit a physical uplink shared channel (PUSCH) and a CoMP A-SRS, further comprising:
means for applying the first power control command to the identified A-SRS for uplink channel sounding and PUSCH; and
means for applying the second power control command to said another A-SRS for downlink CoMP set determination; and
means for transmitting the identified A-SRS in accordance with the first power control command.

15. The apparatus of claim 14, further comprising means for receiving signaling indicating which subframes are designated for transmitting which A-SRS.

16. The apparatus of claim 15, wherein the indication of which subframes are designated for which A-SRS is identified via higher layer signaling.

17. The apparatus of claim 14, wherein:
the subsequent subframe comprises a next available subframe that is designated for transmitting A-SRS; and
the identified A-SRS comprises an A-SRS associated with that subframe.

18. The apparatus of claim 17, wherein the next available subframe that is designated for transmitting A-SRS is separated from the first subframe by at least a fixed number of subframes.

19. The apparatus of claim 14, wherein the identified A-SRS is identified via higher layer signaling.

20. The apparatus of claim 14, wherein a frequency of the multiple subsequent subframes is different to allow frequency hopping.

21. The apparatus of claim 14, wherein the identifying is based on a type of control channel.

22. The apparatus of claim 21, wherein the identifying is based on a search space type of the control channel that is used.

23. The apparatus of claim 14, wherein the identifying is based on a downlink control information (DCI) format that is used for SRS triggering and power control command.

24. The apparatus of claim 14, wherein the identifying is based on an aggregation level used for the downlink transmission.

25. The apparatus of claim 14, wherein the identifying is based on a defined priority between the first and second A-SRS.

26. An apparatus for wireless communications by a user equipment (UE), comprising:
at least one processor configured to:
maintain separate power control processes for at least a first aperiodic sounding reference signal (A-SRS) and a second A-SRS, wherein the power control process for the first A-SRS comprises a first closed loop power control process and the power control process for the second A-SRS comprises a second closed loop power control process independent of the first closed loop power control process;
receive, in a first subframe, a first downlink transmission triggering transmission of the first or second A-SRS in a subsequent subframe;
identify which of the first or second A-SRS to transmit in the subsequent subframe, wherein the identified A-SRS comprises A-SRS for uplink channel sounding;
receive a second downlink transmission triggering transmission of another A-SRS in the subsequent subframe, said another A-SRS comprising A-SRS for downlink coordinated multipoint (CoMP) set determination;
receive a first power control command that indicates a power control value to apply to the identified A-SRS;
receive a second power control command that indicates a power control value to apply to said another A-SRS in the subsequent subframe, wherein if the first power control command is received in an uplink grant, and wherein if the second power control command is received in accordance with downlink control information (PCI] format 3/3A for a subframe where the UE is expected to transmit a physical uplink shared channel (PUSCH] and a CoMP A-SRS, the at least one processor is configured to:
apply the first power control command to the identified A-SRS for uplink channel sounding and PUSCH, and
apply the second power control command to said another A-SRS for downlink CoMP set determination; and
transmit the identified A-SRS in accordance with the first power control command; and
a memory coupled to the at least one processor.

27. The apparatus of claim 26, wherein the downlink transmission indicates multiple subsequent subframes for triggering transmission of the second A-SRS.

28. The method of claim 26, wherein the at least one processor is configured to receive signaling indicating which subframes are designated for transmitting which A-SRS.

29. The method of claim 28, wherein the indication of which subframes are designated for which A-SRS is identified via higher layer signaling.

30. The method of claim 26, wherein:
the subsequent subframe comprises a next available subframe that is designated for transmitting A-SRS; and
the identified A-SRS comprises an A-SRS associated with that subframe.

31. The method of claim 30, wherein the next available subframe that is designated for transmitting A-SRS is separated from the first subframe by at least a fixed number of subframes.

32. The method of claim 26, wherein the at least one processor is configured to identify the identified A-SRS via higher layer signaling.

33. The method of claim 26, wherein a frequency of the multiple subsequent subframes is different to allow frequency hopping.

34. The method of claim 26, wherein the at least one processor is configured to identify which of the first or second A-SRS to transmit in the subsequent subframe based on a type of control channel.

35. The method of claim 34, wherein the at least one processor is configured to identify which of the first or second A-SRS to transmit in the subsequent subframe based on a search space type of the control channel that is used.

36. The method of claim 26, wherein the at least one processor is configured to identify which of the first or second A-SRS to transmit in the subsequent subframe based on a downlink control information (DCI) format that is used for SRS triggering and power control command.

37. The method of claim 26, wherein the at least one processor is configured to identify which of the first or second A-SRS to transmit in the subsequent subframe based on an aggregation level used for the downlink transmission.

38. The method of claim 26, wherein the at least one processor is configured to identify which of the first or second A-SRS to transmit in the subsequent subframe based on a defined priority between the first and second A-SRS.

39. A non-transitory computer-readable medium having code for:
maintaining separate power control processes for at least a first aperiodic sounding reference signal (A-SRS) and a second A-SRS, wherein the power control process for the first A-SRS comprises a first closed loop power control process and the power control process for the second A-SRS comprises a second closed loop power control process independent of the first closed loop power control process;
receiving, in a first subframe, a first downlink transmission triggering transmission of the first or second A-SRS in a subsequent subframe;
identifying which of the first or second A-SRS to transmit in the subsequent subframe, wherein the identified A-SRS comprises A-SRS for uplink channel sounding;
receiving a second downlink transmission triggering transmission of another A-SRS in the subsequent subframe, said another A-SRS comprising A-SRS for downlink coordinated multipoint (CoMP) set determination;
receiving a first power control command that indicates a power control value to apply to the identified A-SRS;
receiving a second power control command that indicates a power control value to apply to said another A-SRS in the subsequent subframe, wherein if the first power control command is received in an uplink grant, and wherein if the second power control command is received in accordance with downlink control information (PCI) format 3/3A for a subframe where the UE is expected to transmit a physical uplink shared channel (PUSCH) and a CoMP A-SRS, further comprising:

applying the first power control command to the identified A-SRS for uplink channel sounding and PUSCH; and applying the second power control command to said another A-SRS for downlink CoMP set determination; and transmitting the identified A-SRS in accordance with the first power control command.

\* \* \* \* \*